United States Patent [19]

Lisec

[11] Patent Number: 4,494,283
[45] Date of Patent: Jan. 22, 1985

[54] DEVICE FOR FILLING SPACING MOUNTING FRAMES WITH HYGROSCOPIC MATERIAL

[76] Inventor: Peter Lisec, Bahnhofstrasse 34, Amstetten-Hausmening, Austria

[21] Appl. No.: 413,227

[22] Filed: Aug. 25, 1982

[30] Foreign Application Priority Data

Apr. 19, 1982 [AT] Austria ............................. 1506/82

[51] Int. Cl.³ ..................... B65B 7/28; E06B 1/16
[52] U.S. Cl. ............................ 29/33 K; 29/564.1; 29/797
[58] Field of Search ............ 29/33 R, 33 K, 564.1, 29/797; 52/171, 172, 202, 203, 204, 205, 403, 52/564, 235, 451; 141/98; 53/381 R, 329, 468, 478, 53/489

[56] References Cited

U.S. PATENT DOCUMENTS

| | | | |
|---|---|---|---|
| 3,114,179 | 12/1963 | Briggs | 52/403 |
| 4,120,999 | 10/1978 | Chenel et al. | 52/172 X |
| 4,257,202 | 3/1981 | Biro | 52/403 X |
| 4,279,065 | 7/1981 | Sernevi | 29/33 K |
| 4,291,458 | 9/1981 | Flinn | 29/33 R |
| 4,301,581 | 11/1981 | Bader et al. | 29/564 X |

FOREIGN PATENT DOCUMENTS 2907838  9/1980  Fed. Rep. of Germany ..... 29/33 K

Primary Examiner—William R. Briggs
Assistant Examiner—Glenn L. Webb
Attorney, Agent, or Firm—Young & Thompson

[57] ABSTRACT

A device for filling spacing mounting frames of insulating glass with hygroscopic material. Spacing mounting frames have corners that are formed integrally by bending from a single hollow profiled bar. A mounting support (8,18) is provided for the spacing mounting frame (1) to be filled and at least one multi-purpose tool (10) which preferably rotates like a turret head, is provided with three sequentially usable tools, namely: a drill (12) for forming an opening in the outer wall of the spacing mounting frame, a nozzle (13) for feeding the hygroscopic material into the spacing mounting frame (1) and a nozzle (14) for sealing the inlet opening.

9 Claims, 6 Drawing Figures

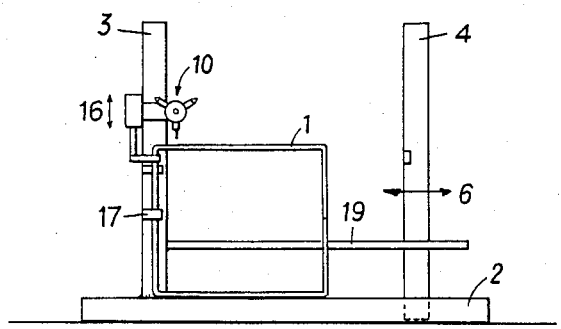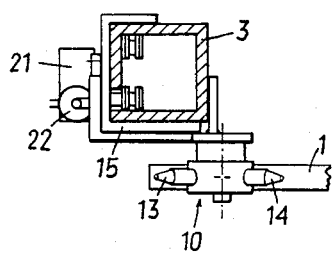

DEVICE FOR FILLING SPACING MOUNTING FRAMES WITH HYGROSCOPIC MATERIAL

The invention relates to a device for filling spacing mounting frames for insulating glass with hygroscopic material, the spacing mounting frames having corners that are formed integrally by bending, especially spacing mounting frames made by bending from a single hollow profiled bar.

In spacing mounting frames for insulating glass which consist of straight hollow profiled bars connected at the corners by corner angle pieces of plastic or metal which are inserted into the hollow profiled bars, the hygroscopic material is fed into the hollow profiled bars before the spacing mounting frames are fitted together. This method is not possible in the case of one-piece spacing mounting frames produced by bending.

It has therefore already been proposed to feed in the hygroscopic material in the course of the production of the hollow profiled bars which are to be bent to form the spacing mounting frames before the metal strip, which is formed into a hollow profiled bar for example in a roll forming machine, is closed into a hollow profile. This method also is disadvantageous insofar as the hygroscopic material is exposed for a comparatively long time to the atmosphere and thus loses a substantial part of its water vapor absorbing capacity.

A further problem consists in the fact that the hygroscopic material in this method can be positively fed into the U-shaped metal strips only from above, so that difficulties result when the hollow profiled strip is bent into a spacing mounting frame, since the longitudinal slot of the hollow profiled strip, via which the hygroscopic material develops its effectiveness, must be located on the inner side of the spacing mounting frame. This problem is also not solved in DE-AS No. 2 907 838 in which the method just referred to is described. In the method of DE-AS No. 2 907 838, the hollow profiled strip is, as is clear from FIG. 1, so bent that its longitudinal seam comes to lie in the region of the outer wall of the spacing mounting frame. The different arrangement shown in FIG. 5 of DE-AS No. 2 907 838 is thus not correct.

The invention solves the problem of providing a device of the above-mentioned type which makes it possible without any problem to fill finished bent and thus closed spacing mounting frames.

According to the invention the device is characterized by a mounting support for the spacing mounting frame to be filled and by at least one multi-purpose tool which is preferably arranged like a turret head and is provided with a device, e.g. a drill, for forming an opening in the outer wall of the spacing mounting frame, a nozzle for feeding the hygroscopic material into the spacing mounting frame and a nozzle for sealing the inlet opening.

The device according to the invention enables an opening to be formed in the spacing mounting frame, the hygroscopic material to be fed into the spacing mounting frame and the opening to be reclosed in an airtight manner without the spacing mounting frame having to be brought at intervals into various different working stations.

Further details and features of the invention will become apparent from the ensuing description of the embodiments that are shown partly diagrammatically in the drawings.

In the drawing:

FIG. 3 shows a second embodiment of a device for the filling of spacing mounting frames;

FIG. 4 shows the multi-purpose tool of the embodiment according to FIG. 3 on an enlarged scale;

FIG. 5 is a section along the line V—V in FIG. 4; and

FIG. 6 is a section along the line VI—VI in FIG. 4.

Figure 1:
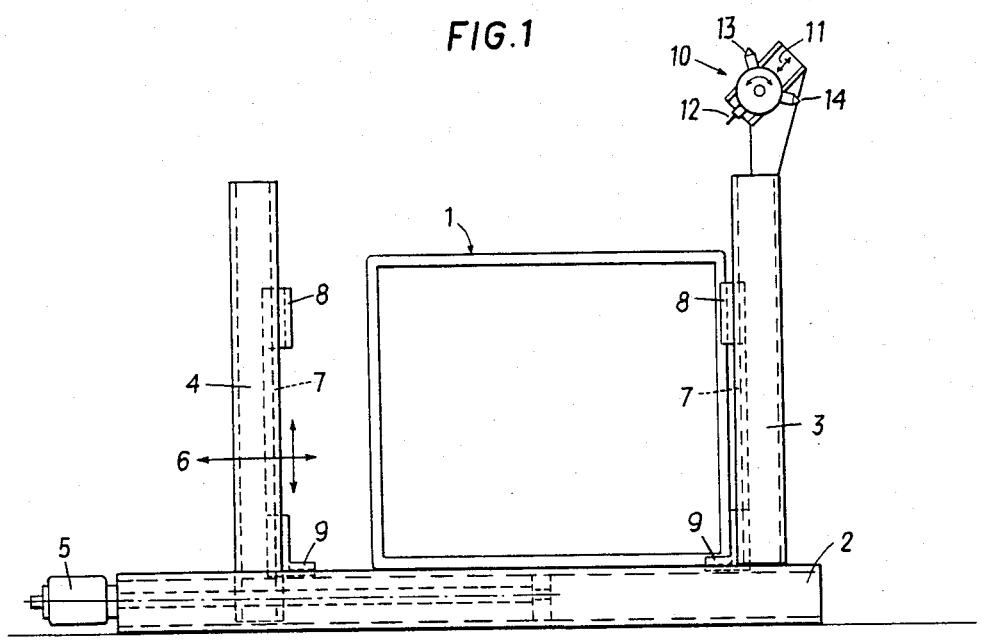
FIG. 1 is an elevational view of a first embodiment of a device for the filling of spacing mounting frames.
Figure 2:
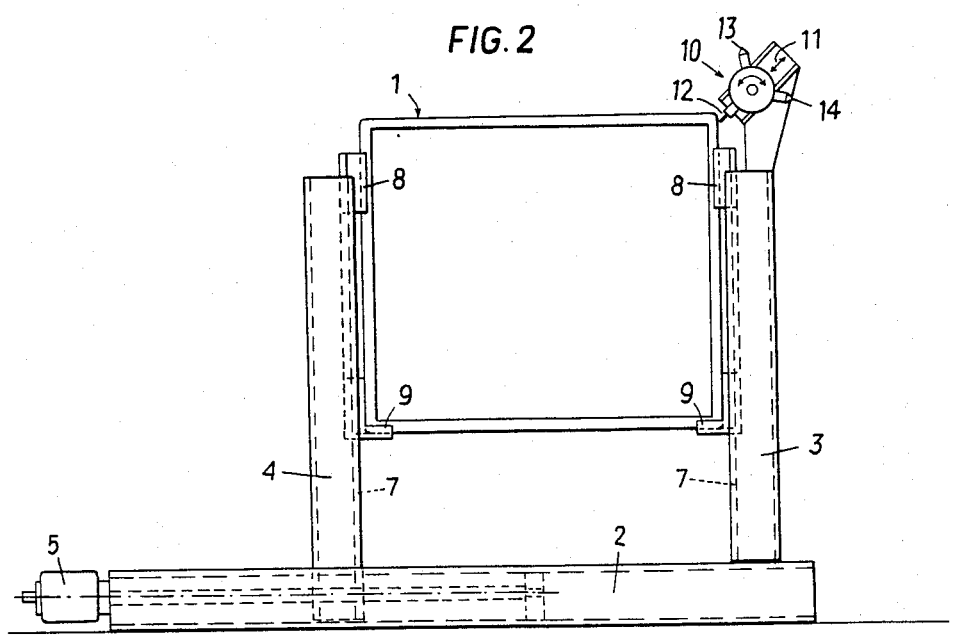
FIG. 2 shows the device of FIG. 1 in which the corner region of a spacing mounting frame is located within the operational zone of a multi-purpose tool.

The device shown in FIGS. 1 and 2 for the filling of spacing mounting frames 1 has two columns 3 and 4 projecting upwardly from a base 2. The column 3 is fixedly mounted on the base 2 while the column 4 is slidable to and fro on the base in the direction of the double arrow 6 by means of a drive 5. Due to the adjustability of the column 4 with respect to the column 3, the device can be adapted to suit the dimensions of the spacing mounting frame to be filled. Guides 8 and lifting angles 9 are provided on the sides of the columns 3 and 4 that face toward each other and are slidable up and down in grooves 7. In the starting position, the horizontal limbs of the lifting angles 9 are located within the base 2 so that the spacing mounting frame 1 can easily be inserted into the guide 8 in the column 3.

According to a simplified embodiment (not shown), the spacing mounting frame may be directly held and guided in guide grooves in the columns 3 and 4.

After the spacing mounting frame 1 has been inserted, standing on the base 2 in the recessed lifting angles 9 and in the guide 8, the column 4 is displaced toward the column 3 until the guide 8 provided on the column 4 and the lifting angle 9 engage the associated portion of the spacing mounting frame 1. Then, by operating the lifting angles 9, the spacing mounting frame 1 is raised to the position shown in FIG. 2, in which the corner region is opposite a working tool 10.

The working tool 10 carries a turret head which is slidable in the direction of the double arrow 11 and is provided with a nozzle 13 for filling in the hygroscopic material (e.g. molecular sieve) and a nozzle 14 for sealing the opening in the spacing holding frame 1 formed by the drill 12 after the filling in of the hygroscopic material.

The device just described may also have associated with it a device which, for example, operates with ultra sound for determining the filling of the spacing mounting frame with hygroscopic material.

It is also possible to provide a multi-purpose tool 10 on the column 4 if an especially rapid filling of the spacing mounting frame 1 is desired. Such a second multi-purpose tool 10 would be used particularly when spacing mounting frames assembled from two U-shaped bent parts are to be filled. In this case, the spacing mounting frame is inserted in the device in such a manner that those limbs of the frame that have junctions are disposed horizontally.

The modified embodiment shown in FIGS. 3 to 6 also has two columns 3 and 4 which are arranged on a base 2, the column 4 once again being slidable in the direction of the double arrow 6. On the column 3 and/or on the column 4 there is again provided a multi-purpose working tool 10 which is slidable to and fro in the direction of the double arrow 16 along the column 3 on a slide 15.

There is provided on the column 3 and possibly also on the column 4 a clamp 17 which is for example springloaded and prevents the spacing mounting frame 1 which is engaged with the column 3 from tilting before it is fixed by the mounting support 18 provided on the slide 15.

Between the columns 3 and 4 there is further provided a supporting strip 19 which prevents the spacing mounting frame 1 from reaching the zone of movement of the column 4.

After a spacing mounting frame 1 is temporarily held by the clamp 17 against the column 3, the slidable column 4 is so slid against the frame 1 that the second vertical limb of the spacing mounting frame 1 is held. This is particularly crucial when a multi-purpose tool 10 is also provided on the column 4. If such a multi-purpose tool is not provided on the column 4, then the column 4 is not absolutely essential.

In this connection, the slide 15 is lowered together with the multi-purpose tool 10 and, after reaching the correct adjustment with respect to the associated corner region of the spacing mounting frame 1, which may be determined by switches which are not specifically shown, e.g. switches that do not respond to contact (proximity switches, light barriers and the like), the corner region of the spacing mounting frame is fixed by the mounting support 18. The mounting support 18, as shown particularly in FIG. 6, comprises an abutment 19 fixed to the slide 15 and a pivoted clamp jaw 20 for the operation of which a pressure medium cylinder 21 is provided. After the spacing mounting frame has been fixed by the mounting support 18, the multi-purpose tool 10 is lowered to the working position by operating a further pressure medium cylinder 22 and by means of the drill first produces an opening in the manner previously described, then by means of the nozzle 13 feeds in the hygroscopic material and lastly by means of the nozzle 14 reseals the opening produced by the drill 12.

After the completion of these operations, the mounting support 18 is reopened, the slide 15 with the multi-purpose tool is raised and the spacing mounting frame filled with hygroscopic material (e.g. molecular sieve) is removed from the device.

The feeding of hygroscopic material into the hollow spacing mounting frame 1 may be assisted by the use of compressed air and/or vibration.

The use of a thermoplastic adhesive (heat meltable) is particularly recommended as a material for the sealing of the hole produced by the drill 12. The thermoplastic adhesive is introduced in a quantity which not only seals the bore in the wall of the spacing mounting frame 1, but also fills the region of the hollow space within the spacing mounting frame 1 that adjoins the bore.

As already mentioned, devices that operate for example with ultrasonic waves may be provided for ascertaining the degree of filling. It is also possible however to carry out the supply of the correct quantity of hygroscopic material to be introduced into the spacing mounting frame simply in dependence on time.

As shown by the drawings, the multi-purpose tool does not engage directly with a corner, but is offset with respect thereto downwardly in FIGS. 1 and 2 and laterally in FIGS. 3 to 6. Of course it is also possible in the embodiment according to FIGS. 3 to 6 to allow the multi-purpose tool 10 to engage below the corner associated therewith. In this case the rotating head with the drill 12 and the nozzles 13 and 14 may also be displaced forwardly into the working position. Equivalent modifications are also possible in the embodiment according to FIGS. 1 and 2.

What is claimed is:

1. Device for filling spacing mounting frames of insulating glass with hygroscopic material, the spacing mounting frames having corners that are formed integrally by bending from a single hollow profiled bar, comprising a mounting support (8,18) in the form of two substantially vertical upstanding columns (3,4) having means for supporting between them the spacing mounting frame (1) to be filled and at least one multi-purpose tool (10) having means (12) for forming an opening in the outer wall of the spacing mounting frame, a nozzle (13) for feeding the hygroscopic material into the spacing mounting frame (1) and a nozzle (14) for supplying material used for sealing the inlet opening.

2. Device according to claim 1, in which the spacing between said columns (3,4) is adjustable, there being a said multi-purpose tool (10) on at least one of the columns (3,4).

3. Device according to claim 2, and on the columns (2,4) guides (8) facing toward each other for the spacing mounting frame (1) and lifting angles (9) which can be raised and lowered for the spacing mounting frame (1), so that the spacing mounting frame (1) received in the guides (8) can be raised with its upper corner in the operational zone of the multi-purpose tool (10).

4. Device according to claim 3, in which the lifting angles (9) can be lowered into grooves located between the columns (3,4) in a base (2) that carries one of the columns (3,4).

5. Device according to claim 2, in which the multi-purpose tool (10) is disposed on a slide (15) which can be slid up and down on one of the columns (3) and on which there is a clamp (18) for holding the spacing mounting frame (1) stationary during the working process.

6. Device according to claim 5, and a clamp (17) on at least one of the two columns (3,4) for temporarily securing the spacing mounting frame (1).

7. Device according to claim 1, in which the frame (1) is held at a distance from the columns (3,4).

8. Device according to claim 1, in which said multi-purpose tool (10) is mounted for rotation on and relative to one of said columns (3,4) thereby successively to bring into operative position said means (12) for forming an opening, said nozzle (13) for feeding the hygroscopic material, and said nozzles (14) for sealing said opening.

9. Device according to claim 8, and means mounting said multi-purpose tool (10) on said one column (3,4) for rectilinear sliding movement toward and away from a said frame to be filled.

* * * * *